Figure 1:
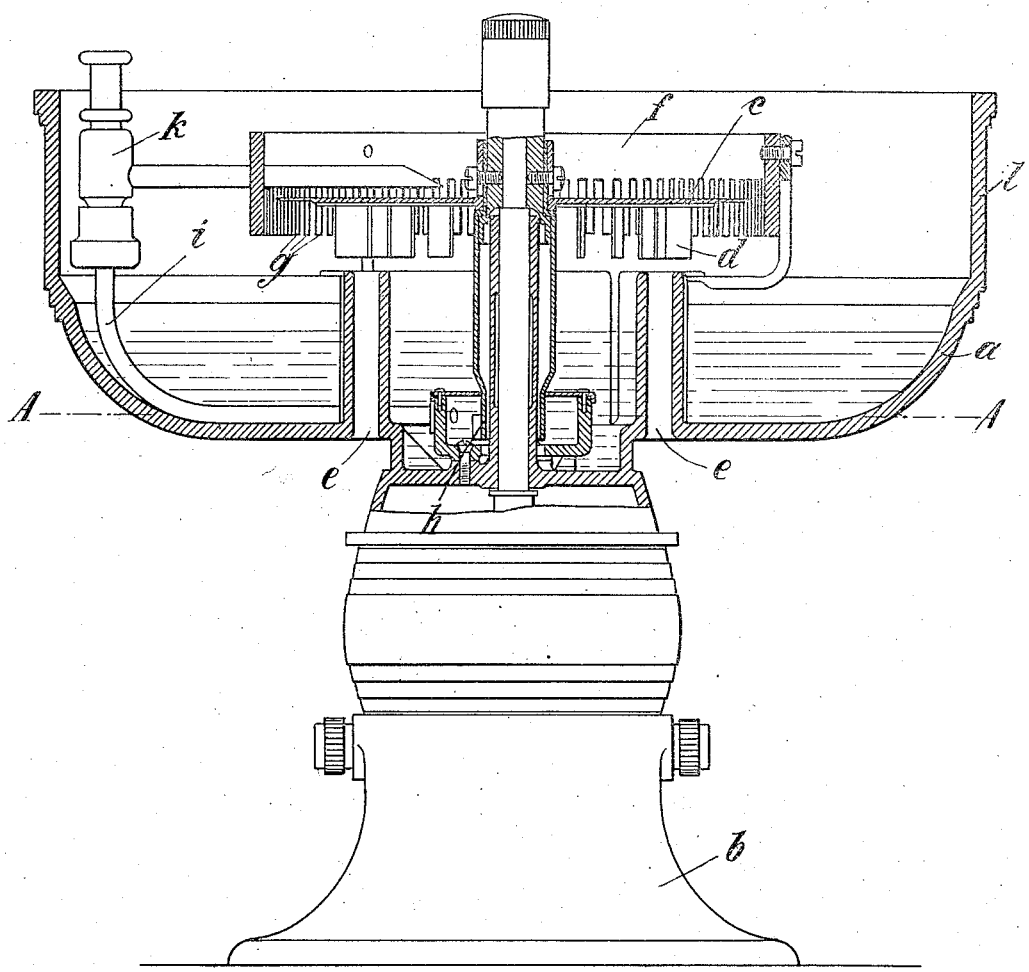

C. H. PRÖTT.
AIR MOISTENING APPARATUS.
APPLICATION FILED OCT. 10, 1911.

1,094,592.

Patented Apr. 28, 1914.

Witnesses.
Albert F. Nufer
L. Nufer

Inventor.
Carl Heinrich
Prött

UNITED STATES PATENT OFFICE.

CARL HEINRICH PRÖTT, OF RHEYDT, GERMANY.

AIR-MOISTENING APPARATUS.

1,094,592.   Specification of Letters Patent.   Patented Apr. 28, 1914.

Application filed October 10, 1911. Serial No. 653,857.

*To all whom it may concern:*

Be it known that I, CARL HEINRICH PRÖTT, a citizen of the German Empire, residing at Rheydt, in the Province of Rhenish Prussia, Kingdom of Prussia, Germany, have invented certain new and useful Improvements in Air-Moistening Apparatus; and I do hereby declare the following to be a full, clear, and exact description of the invention, such as will enable others skilled in the art to which it appertains to make and use the same.

The present application relates to an improved air-moistening apparatus.

In the case of the hitherto known air-moistening apparatuses having a horizontally rotating distributing disk to which the liquid is raised from a liquid-containing vessel the members drawing the air by suction are arranged above the distributing disk. The air is consequently drawn from above and is then diverted laterally together with the liquid in the state of spray over the plate-shaped edge of the liquid-containing vessel. These old contrivances, however, possess the defect that the particles of liquid which condense and become deposited on the edge of the vessel, are carried away by and with the air which is driven under a high pressure over said edge, the result being that said air is supersaturated with moisture. Consequently if such a contrivance be set in operation in living-rooms or the like, there becomes at once apparent the additional defect that the particles of liquid projected from the apparatus with the current of air readily injure the furniture and walls.

The apparatus according to the present invention consists of a new vertical air-moistening apparatus having a horizontally rotating distributing disk, in the case of which the defects cited above are avoided.

The novelty of the apparatus consists in the members which draw the air by suction being arranged underneath the distributing disk in the interior of the cell-ring, so that the air is drawn from below upward and is then led away together with the liquid in the form of spray upward out of the apparatus. Consequently the air after being saturated with the liquid in the form of spray does not again come into contact with the descending particles of liquid, so that said particles cannot be carried away with the air. Further, the moistened air, since it does not leave the apparatus laterally, does not do any harm to the walls and furniture. The air might, indeed, even be led away from the apparatus through pipes, which could not be done in the case of the old forms of air-moistening apparatus having horizontally rotating distributing disks.

One embodiment of the present invention is illustrated in the accompanying drawing, in which:—

Figure 2:
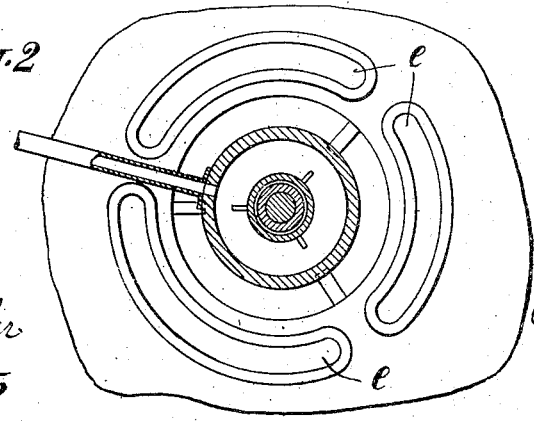

Figure 1 is a vertical section, and Fig. 2 a section on the line A—A, Fig. 1.

In the drawing $a$ designates the liquid-containing vessel which rests on a base $b$ in which an electric motor driving the horizontal distributing-disk $c$ is mounted. On the under surface of the disk $c$ air-vanes $d$ are arranged radially for example, which on the disk $c$ rotating pass over three air-shafts $e$ which pass through the bottom of the vessel $a$ and terminate close under the vanes $d$. The disk $c$ is surrounded in a well-known manner by a cell-ring $f$ which is provided with small rebound-plates $g$ and is secured in the example illustrated on the air-shafts $e$. The liquid is raised to the distributing disk $c$ by the aid of the pipe $i$ and the rotary pump $h$ arranged at the bottom of the vessel $a$, a device $k$ which serves to regulate the flow being inserted in the pipe $i$. The air-vanes $d$ draw the air from below upward through the shafts $e$ and force it through between the disk $c$ and the cell-ring $f$ where it becomes saturated with the liquid converted into spray by the disk $c$. A cylindrical rim $l$ provided on the vessel $a$ conducts upward the air charged with moisture.

What I claim as my invention and desire to secure by Letters Patent is:—

In combination with a rotating spraying disk, and vanes for air suction arranged in the path of the spray, means for atomizing the latter, a vessel arranged below said disk and containing the entire supply of water therefor, means for raising water to the top of said disk and air tubes passing up through the bottom of the said vessel and through the volume of water contained therein and subject to the suction of said vanes, the whole constituting a compact, portable, air-moistening apparatus.

In testimony whereof, I have signed my name to this specification in the presence of two subscribing witnesses.

CARL HEINRICH PRÖTT. [L. S.]

Witnesses:
L. NUFER,
A. NUFER.